(12) United States Patent
Razin et al.

(10) Patent No.: US 9,910,707 B2
(45) Date of Patent: Mar. 6, 2018

(54) INTERFACE FOR ORCHESTRATION AND ANALYSIS OF A COMPUTER ENVIRONMENT

(71) Applicant: SIOS Technology Corporation, Lexington, SC (US)

(72) Inventors: Sergey A. Razin, Columbia, SC (US); Joe Moukabaa, San Francisco, CA (US); Harold Jason Treulich, Westerly, RI (US); Travis Goldie, Lexington, SC (US); Yokuki To, Columbia, SC (US); Scott Thoman, Columbia, SC (US); Paul R. Clements, Jr., Lexington, SC (US); James Bernard Crocker, Columbia, SC (US)

(73) Assignee: SIOS Technology Corporation, Lexington, SC (US)

( * ) Notice: Subject to any disclaimer, the term of this patent is extended or adjusted under 35 U.S.C. 154(b) by 0 days.

(21) Appl. No.: 14/796,161

(22) Filed: Jul. 10, 2015

(65) Prior Publication Data
US 2016/0188370 A1 Jun. 30, 2016

Related U.S. Application Data

(60) Provisional application No. 62/023,053, filed on Jul. 10, 2014.

(51) Int. Cl.
*G06F 9/54* (2006.01)
*G06F 9/50* (2006.01)
(Continued)

(52) U.S. Cl.
CPC ............ *G06F 9/5011* (2013.01); *G06F 11/30* (2013.01); *G06F 11/3024* (2013.01);
(Continued)

(58) Field of Classification Search
None
See application file for complete search history.

(56) References Cited

U.S. PATENT DOCUMENTS 8,688,643 B1\* 4/2014 Deopujari ............... G06F 3/061
707/655
8,738,972 B1\* 5/2014 Bakman ............. G06F 11/0712
714/47.1

(Continued)

OTHER PUBLICATIONS

International Search Report dated Oct. 23, 2015 from the corresponding International Application No. PCT/US15/039887.

*Primary Examiner* — Timothy A Mudrick
*Assistant Examiner* — Abdou Seye
(74) *Attorney, Agent, or Firm* — Duquette Law Group, LLC

(57) ABSTRACT

A host server is configured to receive information related to metrics and configurations associated with computer resources of a computer infrastructure, derive and resolve the information into capacity, performance, reliability, and efficiency, as related to attributes associated with the computer resources, including compute attributes such as application, virtual machine (VM) attributes, storage attributes, and network attributes. The host server provides the metrics and attributes in a matrix configuration as a graphical user interface (GUI) on an output device, such as a display. The GUI is configured to provide a user with a single point of view into the computer infrastructure by converging application, compute, storage, and network attributes into capacity, performance, reliability, and efficiency concepts. With such a configuration, the GUI allows the end user to readily review the environments for potential issues in a time efficient manner, as well as solutions provided by the GUI.

20 Claims, 11 Drawing Sheets

|    | 54 | 56 | 55 | 52 |
|---|---|---|---|---|
| 58 → | PERFORMANCE OVERVIEW | EFFICIENCY OVERVIEW | RELIABILITY OVERVIEW | CAPACITY OVERVIEW |
| 60 → | COMPUTE PERFORMANCE | COMPUTE EFFICIENCY | COMPUTE RELIABILITY | COMPUTE CAPACITY |
| 62 → | STORAGE PERFORMANCE | STORAGE EFFICIENCY | STORAGE RELIABILITY | STORAGE CAPACITY |
| 64 → | NETWORK PERFORMANCE | NETWORK EFFICIENCY | NETWORK RELIABILITY | NETWORK CAPACITY |

(51) Int. Cl.
  *G06F 11/30* (2006.01)
  *G06F 11/34* (2006.01)
  *G06F 11/32* (2006.01)

(52) U.S. Cl.
  CPC ........ *G06F 11/323* (2013.01); *G06F 11/3409* (2013.01); *G06F 11/3495* (2013.01); *G06F 11/3433* (2013.01); *G06F 11/3442* (2013.01)

(56) References Cited

U.S. PATENT DOCUMENTS

| | | |
|---|---|---|
| 2009/0300173 A1 | 12/2009 | Bakman et al. |
| 2009/0307597 A1* | 12/2009 | Bakman ................ G06F 11/008 715/736 |
| 2012/0216135 A1 | 8/2012 | Wong et al. |
| 2013/0159221 A1 | 6/2013 | Thompson |
| 2013/0218547 A1* | 8/2013 | Ostermeyer ........ G06F 17/5009 703/13 |
| 2013/0290857 A1 | 10/2013 | Beveridge |
| 2013/0300747 A1 | 11/2013 | Wong et al. |
| 2014/0281741 A1* | 9/2014 | Bohacek ............ G06F 11/3409 714/47.3 |
| 2015/0142506 A1* | 5/2015 | Kumar ............... G06Q 10/0635 705/7.28 |

\* cited by examiner

| ☰ | Unpin | | | | Group by Application Group | | Open Filter | | Properties | ⌄ | ⋯ |
|---|---|---|---|---|---|---|---|---|---|---|---|

DASHBOARDS

| Availability | | | | | | | | |
|---|---|---|---|---|---|---|---|---|
| Virtual Machine | ⌄ | Environment | Health | Current Host | | Health | Failover Host | Health |
| ⌄ Americas_SAP Cluster | | | | | | | | |
| ⊘ Virtual Machines: 0 issues | | | ▲ Current Hosts: 5 issues | | | ⊗ Failover Hosts: 5 issues | | |
| Finance_SAP_BE | | Northeast | OK | Dell_Sys1 | | Degraded | Dell_Sys4 | Failed |
| Finance_SAP_FE | | Northeast | OK | Dell_Sys2 | | Degraded | Dell_Sys4 | Failed |
| Marketing_SAP_1 | | Northeast | OK | Dell_HPerf_1 | | Degraded | Dell_HPerf_3 | Failed |
| Marketing_SAP_2 | | Northeast | OK | Dell_HPerf_1 | | Degraded | Dell_HPerf_4 | Failed |
| Sales_SAP_Web | | Northeast | OK | HP_Sys1 | | Degraded | Dell_Sys4 | Failed |
| ⌄ Big Data | | | | | | | | |
| ⊘ Virtual Machines: 0 issues | | | ⊘ Current Hosts: 0 issues | | | ⊘ Failover Hosts: 0 issues | | |
| NTT_Hadoop_SRV1 | | Northeast | OK | Cisco_1 | | OK | Cisco_2 | OK |
| NTT_Hadoop_SRV2 | | Northeast | OK | Cisco_1 | | OK | Cisco_4 | OK |
| NTT_Hadoop_SRV3 | | Northeast | OK | Cisco_1 | | OK | Cisco_3 | OK |
| ⌃ SQL_SSD | | | | | | | | |
| ⊘ Virtual Machines: 0 issues | | | ▲ Current Hosts: 9 issues | | | ⊗ Failover Hosts: 9 issues | | |

CPRE Health
System Health
Availability
Waste
Performance
Deployment Details

CUSTOM VIEWS
EMEA VM Health_Last 30-Days
Overview_APAC_Last 30-Days
Overview_EMEA_Last 30-Days
Overview_NA_Last 30-Days

FIG. 9

INTERFACE FOR ORCHESTRATION AND ANALYSIS OF A COMPUTER ENVIRONMENT

RELATED APPLICATIONS

This patent application claims the benefit of U.S. Provisional Application No. 62/023,053, filed on Jul. 10, 2014, entitled, "Interface for Orchestration and Analysis of a Computer Environment," the contents and teachings of which are hereby incorporated by reference in their entirety.

BACKGROUND

Enterprises utilize computer systems having a variety of components. For example, these conventional computer systems can include one or more servers and one or more storage units interconnected by one or more communication devices, such as switches or routers. The servers can be configured to execute one or more virtual machines (VMs) during operation. Each VM can be configured to execute or run one or more applications or workloads.

System administrators can struggle with the allocation of resources within conventional computer systems on the compute level, the network level, the storage level and the application or workload level. In one arrangement, issues regarding storage allocation can arise. For example, system administrators can tend to over allocate the amount of compute resources within the system to users in the enterprise due to inability to clearly understand the amount of resources needed to deliver the service levels (SLA) and guarantee of the performance of the workload. Additionally, issues regarding workload allocation within a computer system can arise. For example, in response to an increase in the number of workers employed by an enterprise, a system administrator can increase the number of VMs executed by the servers beyond the actual needs of the workers. Both of these cases can lead either to an increase in the amount of power consumed by the components of the computer system or to an unnecessary increase in the number of components, such as the number of VMs, of the computer system. Either case can increase the overall costs to the enterprise.

SUMMARY

Conventional computer system management tools, such as dashboards, are used to monitor the computer system components during operation and to provide the system administrator with information regarding the computer system components. However, conventional dashboards offer a limited view into the overall health of the computer system. For example, certain conventional management tools provide the dashboard, via a display, which shows the health and efficiency of VMs within the computer system. These conventional dashboards only offer a systems administrator a glimpse into a single portion of the computer environment without providing an overview of the interaction with other computer system components, such as application, compute, storage, or network components.

Accordingly, conventional dashboards can leave the system administrator to deduce his own unified view of the health and the overall state of a computer system from a single view. The state of the computer system can include (1) right sizing the VMs (i.e. ability to properly size the VMs to the workload) as administrators tend to oversize; (2) identification of waste at any level; (3) satisfaction of workload requirements on the different tiers of the infrastructure that exist (i.e., to make sure that workload that requires high speed disks (SSD/Flash) utilized such, and making sure that in case of failure the workload relocates to the host where all necessary components available); (4) forecasting of system performance when introducing workloads at the each tier of the infrastructure; (5) identification of bottlenecks in the infrastructure that can exist with any of the application/compute/storage/network components; and (6) identification of anomalies in the environment.

By contrast to conventional management systems, embodiments of the present innovation relate to an interface, such as a graphical user interface, for orchestration and analysis of a computer environment. In one arrangement, a host server is configured to receive information related to a variety of metrics associated with the computer resources of a computer infrastructure or computer environment resources, including capacity, performance, reliability, and efficiency, as related to attributes associated with the computer resources, including application attributes, compute attributes such as virtual machine (VM) attributes, storage attributes, and network attributes. The host server can provide the metrics and attributes in a matrix configuration as an interface, such as a graphical user interface (GUI) on an output device, such as a display. The GUI is configured to provide a user with a single point of view into the health and the overall state of the computer infrastructure by converging multiple compute, storage, application, and network attributes into capacity, performance, reliability, and efficiency concepts. With such a configuration, the GUI allows the end user to readily analyze the environments for potential issues in a time efficient manner and to provide a diagnosis of any detected issues. For example, as the end user interacts with the GUI, the GUI provides the end user with insights into the environment, as well as solutions or methods of solving issues detected in the environment.

In one arrangement, the GUI allows a system administrator to readily interpret the information relating to the metrics and attributes of the resources of the computer infrastructure, regardless of the particular manufacturer or source of the resources. Additionally, by providing the attributes and the metrics as part of a matrix, the GUI allows the system administrator to view the relationships among the attributes and metrics in a single location. Based upon this view, the system administrator can make a dashboard selection to cause the host device to display a dashboard showing a health of the computer environment attributes, the availability of the computer environment attributes, the waste associated with the computer environment attributes, and the performance of the computer environment attributes. With these displays, the system administrator can identify and correct a number of issues associated with the computer environment, such as over or under allocation issues regarding various attributes of the computer environment, waste issues associated with the attributes of the computer environment, availably/service level issues, and root cause analysis of the performance and resource content, for example.

In one arrangement, embodiments of the innovation relate to, in a host device, a method for analyzing computer resources in a computer system. The method includes receiving, by the host device, a set of data elements from a computer infrastructure, each data element of the set of data elements relating to at least one of a compute attribute, a storage attribute, and a network attribute of a computer environment resource of the computer infrastructure. The method includes detecting, by the host device, at least one of a performance metric, an efficiency metric, a reliability metric, and a capacity metric for each of the compute attribute, storage attribute, and network attribute associated with the set of data elements. The method includes displaying, by the host device, a graphical user interface, the graphical user interface configured to provide the detected performance metric, efficiency metric, reliability metric, and capacity metric across the compute attribute, storage attribute, and network attribute associated with the set of data elements.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

FIG. 9 illustrates the presentation of the Availability dashboard in response to the host device receiving the Availability dashboard selection of FIG. 8.

DETAILED DESCRIPTION

Figure 1A:
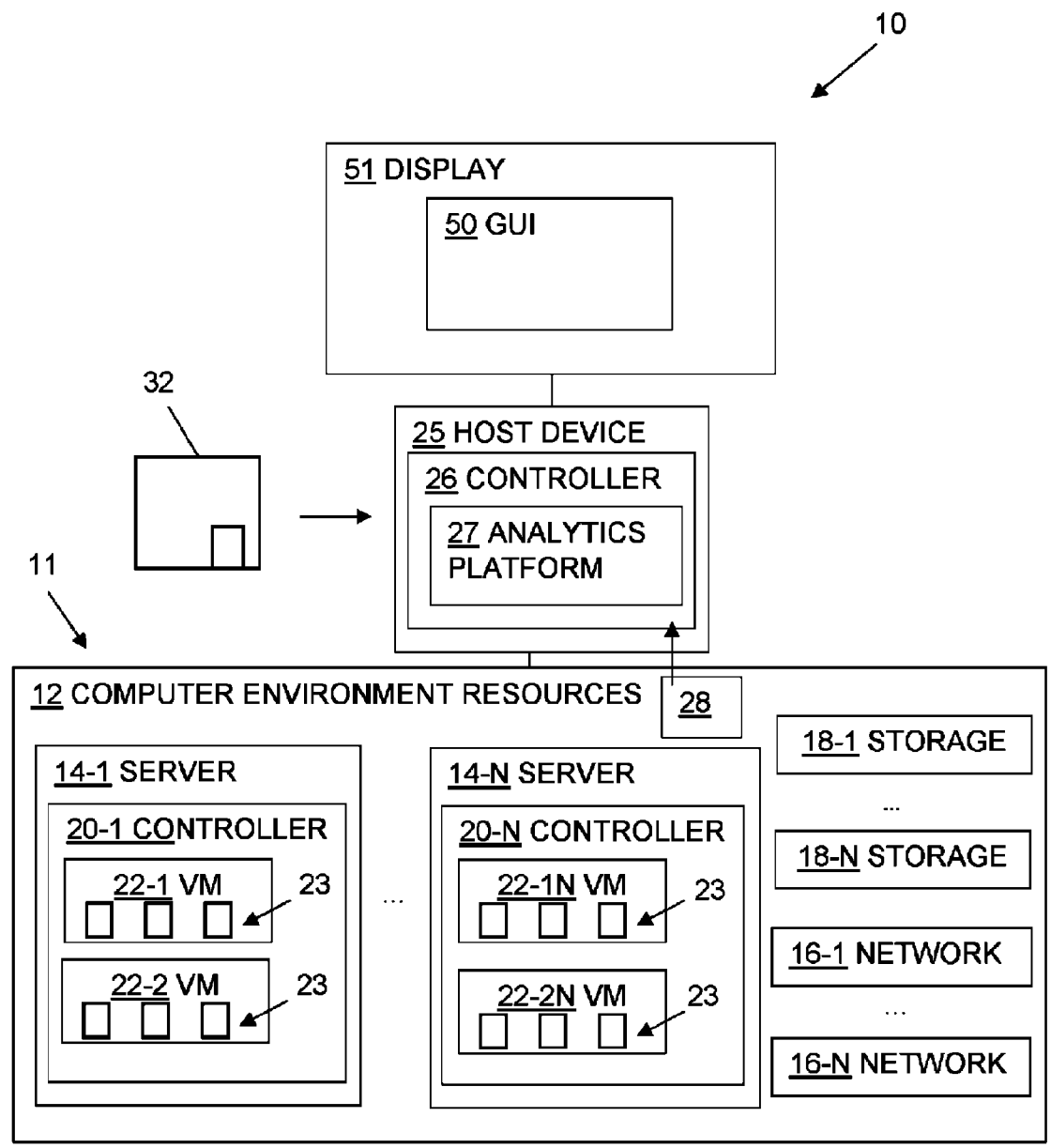
FIG. 1A illustrates a schematic representation of a computer system, according to one arrangement.

Embodiments of the present innovation relate to a graphical user interface for analysis of a computer environment. In one arrangement, a host server is configured to receive information related to metrics associated with computer resources of a computer infrastructure or computer environment resources, including capacity, performance, reliability, and efficiency, as related to attributes associated with the computer resources, including application attributes, compute attributes such as virtual machine (VM) attributes, storage attributes, and network attributes. The host server provides the metrics and attributes in a matrix configuration as a graphical user interface (GUI) on an output device, such as a display. The GUI is configured to provide a user with a single point of view into the computer environment resources or infrastructure by converging application, compute, storage, and network attributes into capacity, performance, reliability, and efficiency concepts. With such a configuration, the GUI allows the end user to readily analyze the environments for potential issues in a time efficient manner and to provide a diagnosis of any detected issues based on the actionable insight reported by the system.

For example, the GUI allows a system administrator to readily interpret the information relating to the metrics and attributes of the resources of the computer infrastructure, regardless of the particular manufacturer or source of the resources. Additionally, by providing the attributes and the metrics as part of a matrix, the GUI allows the system administrator to view the relationships among the attributes and metrics in a single location. Based upon this view, the system administrator can make a dashboard selection to cause the host device to display a dashboard showing a health of the computer environment attributes, the availability of the computer environment attributes, the waste associated with the computer environment attributes, and the performance of the computer environment attributes. With these displays, the system administrator can identify and correct over allocation issues regarding various attributes of the computer environment and waste issues associated with the attributes of the computer environment, for example.

FIG. 1 illustrates an arrangement of a computer system 10 which includes at least one computer infrastructure 11 disposed in electrical communication with a host device 25. While the computer infrastructure 11 can be configured in a variety of ways, in one arrangement, the computer infrastructure 11 includes computer environment resources 12. For example, the computer environment resources 12 can include one or more server devices 14, such as computerized devices, one or more network communication devices 16, such as switches or routers, and one or more storage devices 18, such as disc drives.

Each server device 14 can include a controller or compute hardware 20, such as a memory and processor. For example, server device 14-1 includes controller 20-1 while server device 14-N includes controller 20-N. Each controller 20 can be configured to execute one or more virtual machines 22 with each virtual machine 22 being further configured to execute or run one or more applications or workloads 23. For example, controller 20-1 can execute a first virtual machine 22-1 and a second virtual machine 22-2, each of which, in turn, is configured to execute one or more workloads 23. Each compute hardware element 20, storage device element 18, network communication device element 16, and application 23 relates to an attribute of the computer infrastructure 11.

In one arrangement, the host device 25 is configured as a computerized device having a controller 26, such as a memory and a processor. The host device 25 is disposed in electrical communication with the computer infrastructure 11 and with a display 51. The host device 25 is configured to receive, via a communications port (not shown), a set of data 28 elements from the computer environment resources 12 and to derive a capacity metric, a performance metric, a reliability metric, and an efficiency metric of the computer environment resources 12. These metrics relate to the configuration information of each of the application attributes, compute attributes, storage attributes, and network attributes of the computer infrastructure 11, as well as to statistical data associated with the computer infrastructure 11.

The controller 26 of the host device 25 can store an application for analyzing the computer environment resources 12 in the computer system 10. The analytics application installs on the controller 26 from a computer program product 32. In some arrangements, the computer program product 32 is available in a standard off-the-shelf form such as a shrink wrap package (e.g., CD-ROMs, diskettes, tapes, etc.). In other arrangements, the computer program product 32 is available in a different form, such downloadable online media. When performed on the controller 26 of the host device 25, the analytics application causes the host device 25 to generate and provide a graphical user interface (GUI) 50 via a display 51. The GUI 50 provides a user with a single point of view into the computer environment resources 12 by converging application, compute, storage, and network attributes across capacity, performance, reliability, and efficiency metrics.

Figure 1B:
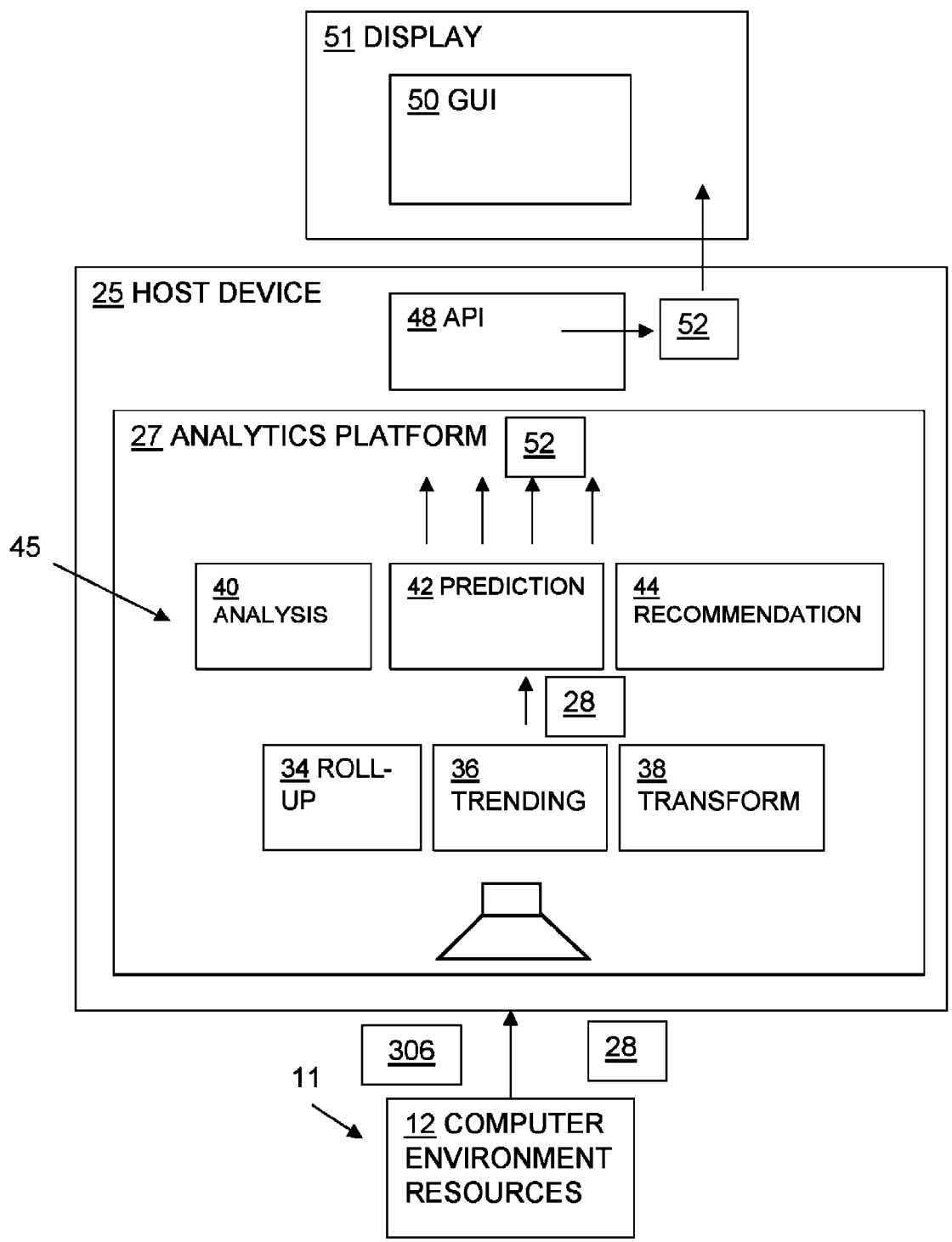
FIG. 1B illustrates a schematic representation of a host device of FIG. 1A processing data elements from a computer infrastructure, according to one arrangement.

During operation, the host device 25 is configured to generate the GUI 50 in a number of ways. With reference to FIGS. 1A and 1B, the following description provides an example of the host device 25 receiving and processing the data elements 28 in order to present the GUI 50 to the end user.

Initially, the host device 25 can receive the set of data elements 28 from the computer infrastructure 11. In one arrangement, each data element of the set of data elements 28 relating to the compute attribute, storage attribute, and network attribute of the computer infrastructure 11. During operation, the host device 25 is configured to obtain data from the computer environment resources 12, such as via public API calls, to obtain data elements 28 relating to the compute, storage, and network attributes of the computer infrastructure 11. For example, the host device 25 can receive data elements 28 that relate to the controller configuration and utilization of the servers devices 12 (i.e., compute attribute), the VM activity in each of the server devices 14 (i.e., application attribute) and the current state and historical data associated with the computer infrastructure 11. In one arrangement, each data element 28 can include additional information relating to the computer infrastructure 11, such as events, statistics, and the configuration of the computer infrastructure 11.

In one arrangement, the host device 25 can direct the data elements to an analytics platform 27 for processing. The analytics platform 27 can be configured to process the data elements 28 in a variety of ways. For example, any number of the computer environment resources 12 can provide the data elements 28 to the host device 25 in a proprietary format. In such a case, the analytics platform 27 of the host device 25 is configured to normalize the data elements 28 using a normalization or roll-up function 34 such that it can be presented to an end user. In another example, as the host device 25 receives data elements 28 over time, the data elements 28 can include varying information regarding each of the storage devices 18 or network devices 16. In such a case, the analytics platform 27 of the host device 25 is configured to average the data elements 28 using a trending or averaging function 36. In another example, as the host device 25 receives data elements 28 over time, the data elements 28 can be presented in a variety of formats. For example, for data elements 28 received from multiple network devices 16 of the computer infrastructure 11, the speed of the devices 16 can be presented in seconds (s) or milliseconds (ms). In such a case, the analytics platform 27 of the host device 25 is configured to format the data elements using a transforming or formatting function 38. GUI 50.

As the host device 25 receives the data elements 28, in one arrangement, the host device 25 detects at least one of a performance metric, an efficiency metric, a reliability metric, and a capacity metric for each of the compute attribute, storage attribute, and network attribute associated with the set of data elements. For example, each data element of the set of data elements 28 can indicate the storage capacity (e.g., an amount of available storage space), the storage performance (e.g., a utilization rate or latency), the storage reliability (e.g., a level of service), and/or the storage efficiency (e.g., an amount of waste) of each corresponding storage device 18-1 through 18-N of the computer infrastructure 11.

As the host device 25 receives the data elements 28, with particular reference to FIG. 1B, the host device 25 is configured to apply at least one detection function 45 to the data elements 28 to extract and process information relating to the various attributes of the computer infrastructure 11. For example, the host device 25 can provide the data elements 28 to an analysis function 40, a prediction function 42, and a recommendation function 44 in order to forecast trends associated with the attributes and metrics of the infrastructure 11 and to diagnose and recommend fixes for specific problems in the computer infrastructure 11.

Based upon the detected metrics, the host device 25 is configured to display the data elements 28 as part of the GUI 50 via the display 51. For example, the host device 25 can retrieve the GUI 50 resulting from the detection function 45 via an API call 48 to the analytics platform 27 and can provide the GUI to the display 51.

As will be described in detail below, the GUI 50 is configured to give the system administrator a single point of view into the computer infrastructure 11. The GUI 50 is configured to provide a high level snapshot of performance (performance metric), resource utilization (efficiency metric), service levels (reliability metric), and utilization (capacity metric) across application, compute, storage, and network attributes.

Figure 2:
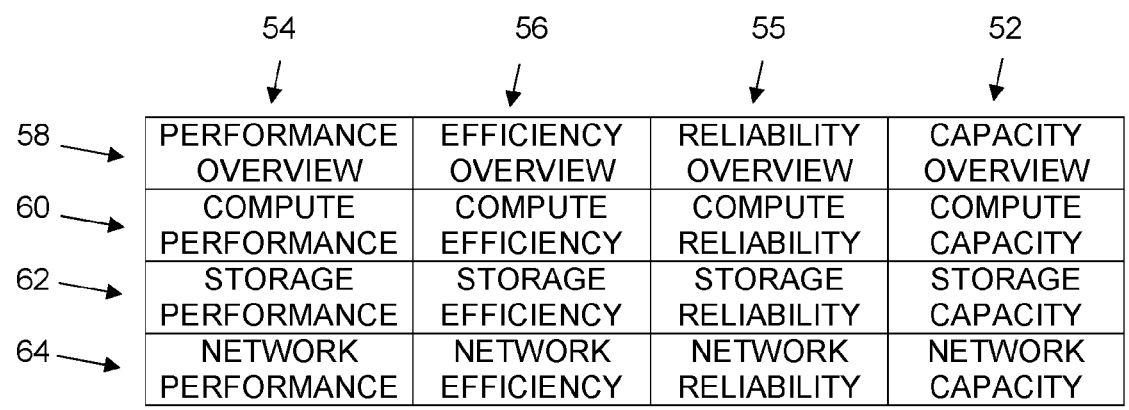
FIG. 2 illustrates a schematic representation of a graphical user interface (GUI) as utilized by the computer system of FIG. 1, according to one arrangement.

FIG. 2 illustrates a schematic representation of the GUI 50 as provided by the host device 25, according to one arrangement. As illustrated, the GUI 50 is configured as a four-by-four matrix that includes four columns representing metrics associated with the computer environment resources 12 and four rows relating to the attributes of the computer environment resources 12.

As illustrated, the columns of the GUI 50 relate to the metrics of performance 54, efficiency 56, reliability 55, and capacity 52 of the computer environment resources 12. Each column provides the end user with information regarding the metrics of the application, compute, network and storage attributes on the previous day (e.g., through trending), today (e.g., how the metrics appear today and over the last 24 hours), and tomorrow (e.g., forecasting) with respect to performance, efficiency, capacity, reliability, and capacity.

In one arrangement, the performance column 54 contains information such as utilization rates, latency, I/O, and throughput related to the computer environment resources 12 of the computer environment 10. For example, the GUI 50 is configured to display the performance column 54 as including a compute performance element, a storage performance element, and a network performance element. The data provided in the performance column 54 can be averaged across a specific filter level set by the user and displayed with respect to the previous day (e.g., through trending), a current day (e.g., based upon a given window or time), or a future day (e.g., through forecasting).

In one arrangement, the efficiency column 56 provides information regarding waste (i.e., both monetary waste and resource waste), density, and other utilizations related to the computer environment resources 12, which can indicate an overall efficiency of the environment 10. For example, the GUI 50 is configured to display the efficiency column 56 as including a compute efficiency element, a storage efficiency element, and a network efficiency element. The data provided in the efficiency column 56 can also be aggregated at a specific filter level set by the user and displayed with respect to the previous day, a current day, or a future day.

In one arrangement, the reliability column 55 contains information regarding service levels and availability of the computer environment resources 12 of the computer environment 10. For example, the GUI 50 is configured to display the reliability column 55 as including a compute reliability element, a storage reliability element, and a network reliability element. The data provided in the reliability column 55 can be aggregated across a specific filter level set by a user.

In one arrangement, the capacity column 52 relates to the aggregate capacity (i.e., the compute, storage, network capacity) at a specific filter level set by the user. For example, the GUI 50 is configured to display the capacity column 52 as including a compute capacity element, a storage capacity element, and a network capacity element. As will be described below, the capacity column 52 is configured to display forecasts associated with each of the attributes.

Also as illustrated in FIG. 2, the rows of the GUI 50 relate to compute 60, storage 62, and network 64 attributes of the computer environment resources 12, as well as to an overview 58 of these attributes for each of capacity, performance, reliability, and efficiency. By providing the metric and attribute information associated with the computer environment resources 12 in a matrix or grid-like format, the host device 25 allows the end user, such as a system administrator, to readily analyze the computer infrastructure 11 through a single window, or GUI 50 for potential issues in a time efficient manner and to provide a diagnosis of any detected issues.

Figure 4:
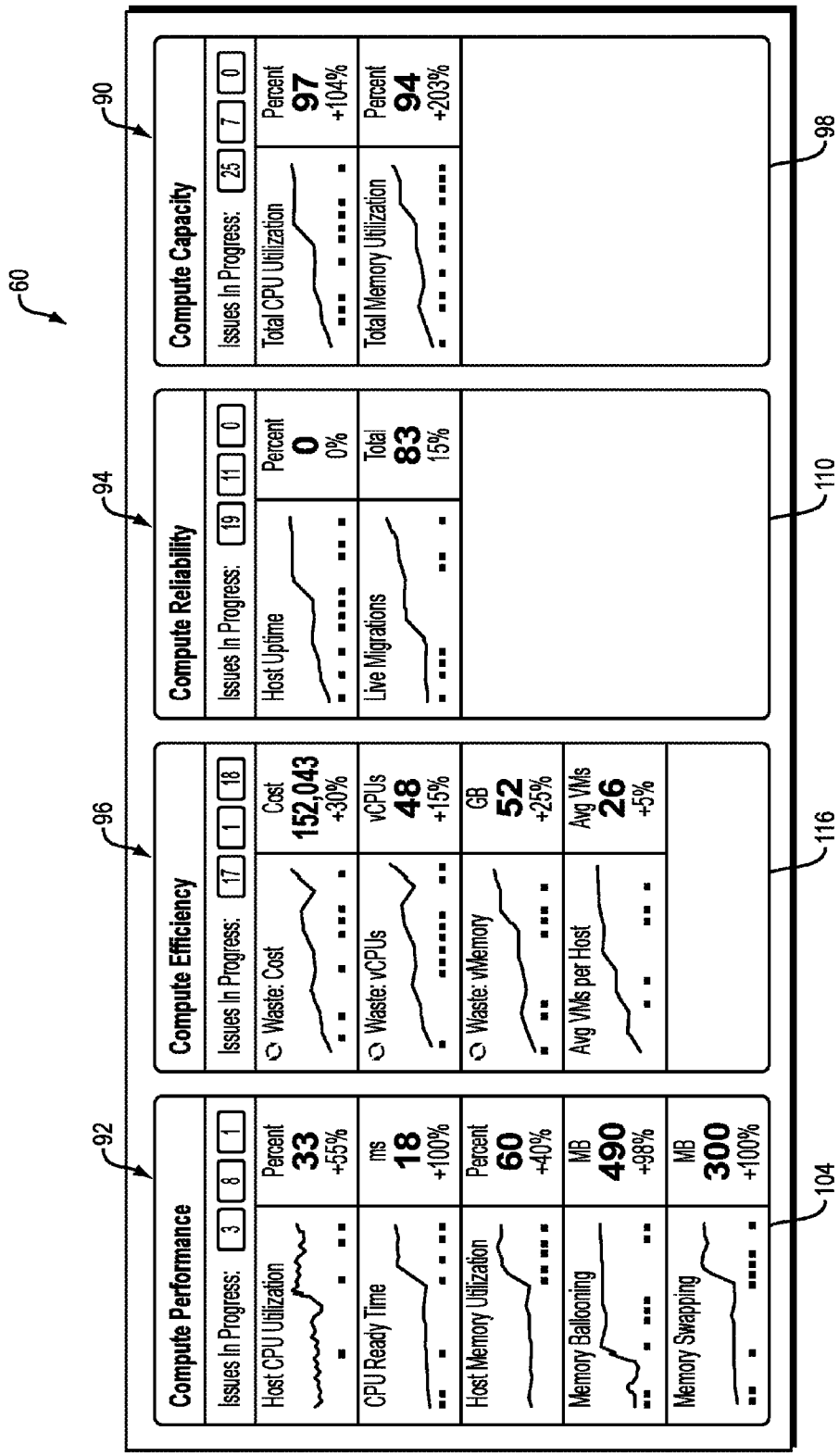
FIG. 4 illustrates a compute attribute row of the GUI of FIG. 2, according to one arrangement.
Figure 5:
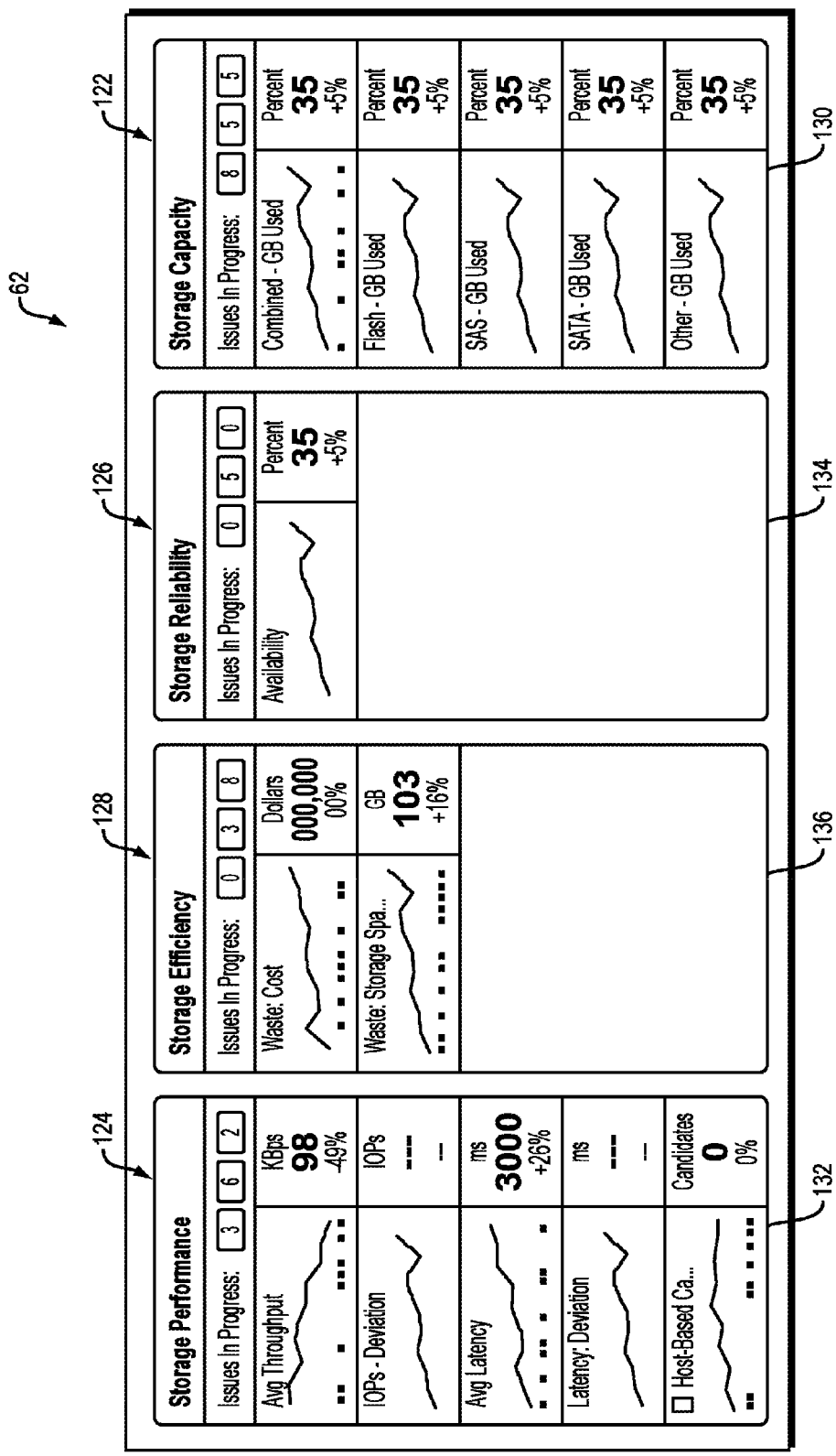
FIG. 5 illustrates a storage attribute row of the GUI of FIG. 2, according to one arrangement.

While the GUI 50 can be configured to display the attribute information in a variety of ways, in one arrangement as provided with respect to FIGS. 3-5 below, the GUI 50 is configured to display information at the aggregate level as well as to highlight specific problems or warnings in workloads or applications, VM(s), host(s), network or storage components within a specified filter level. For example, the GUI 50 can be configured as a matrix having a set of elements. As will be described in detail below, each element can provide a graphical trend of a corresponding performance metric, efficiency metric, reliability metric, and capacity metric for each of the compute attribute, storage attribute, and network attribute. Additionally, as will be described in detail below, each element can provide an indication of a problem or operability issue associated with the performance metric, the efficiency metric, the reliability metric, and the capacity metric for each of the compute attribute, storage attribute, and network attribute. It should be noted that FIGS. 3-6 provides an example of various aspects of the information displayed in a converged fashion and is not intended to be limiting, as the information can be displayed in a variety of ways.

Figure 3:
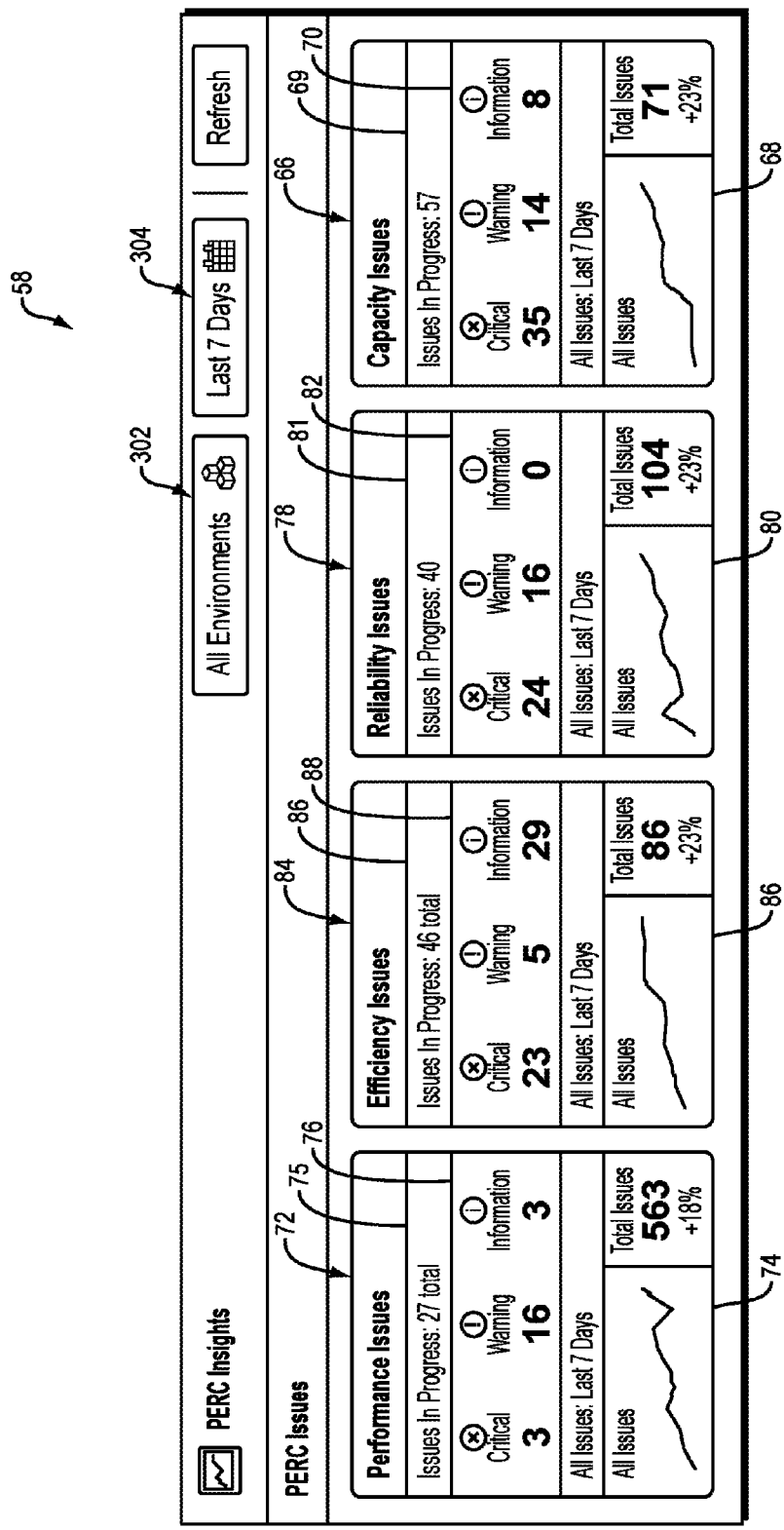
FIG. 3 illustrates an overview attribute row of the GUI of FIG. 2, according to one arrangement.

FIG. 3 illustrates an arrangement of the overview row 58, as provided by the GUI 50, having a performance overview element 72 an efficiency overview element 84, a reliability overview element 78, and a capacity overview element 66.

The performance overview element 72 is configured to capture the detailed number of performance related operability issues and to aggregate the operability issues across the compute, storage, and network attributes of the computer infrastructure 11. For example, the performance overview element 72 includes a Combined Issues summary 74, such as a graph that captures a historical trend of the combined performance related operability issues, a listing of the most current or total number of issues, and a trending number which represents the percentage increase/decrease in the number of issues over the last time period. The performance overview element 72 also includes an Issue Severity Breakdown panel 76 which shows a breakdown of the number current performance related operability issues among Critical, Warning, and Information. A user may drill down on the panel 76 to obtain detailed information on the specific issues. For example, the system administrator can use a mouse or a touch-enabled interface device such as a tablet, to select one of the Critical, Warning, and Information subpanels to obtain additional information regarding the details of the components of the computer environment resources 12 having the performance related issues. In another example, in the case where the host device 25 and display are configured as a tablet or other touch-enabled interface, the system administrator can touch one of the Critical, Warning, and Information subpanels provided by the display 51 to obtain additional information regarding the details of the components of the computer environment resources 12 having the performance related issues. The performance overview element 72 also includes an Issues in Progress summary 75 that identifies the number of performance issues associated with the computer infrastructure 11 across the compute, storage, and network attributes.

The efficiency overview element 84 is configured to captures the detailed number of efficiency related operability issues and to aggregate the operability issues across the compute, storage, and network attributes of the computer infrastructure 11. In one arrangement, efficiency relates to the operation of the environment while minimizing the expenditure of resources and money, for example. For example, an efficiency overview element 84 includes a Combined Issues summary 86, such as a graph that captures a historical trend of the combined efficiency related operability issues, a listing of the most current or total number of issues, and a trending number that represents the percentage increase/decrease in the number of issues over the last time period. The efficiency overview element 84 also includes an Issue Severity Breakdown panel 88 which shows a breakdown of the current efficiency related operability issues among Critical, Warning, and Information. A user may drill down on the panel 88 to obtain detailed information on the specific issues. For example, the system administrator can use a mouse or a touch-enabled interface device such as a tablet, to select one of the Critical, Warning, and Information subpanels to obtain additional information regarding the details of the components of the computer environment resources 12 having the efficiency related issues. The efficiency overview element 84 also includes an Issues in Progress summary 87 that identifies the number of efficiency issues associated with the computer infrastructure 11 across the compute, storage, and network attributes.

The reliability overview element 78 is configured to capture the detailed number of reliability related operability issues and to aggregate the operability issues across compute, storage, and network attributes of the computer infrastructure 11. In one arrangement, reliability is based on established service levels in the system, which includes performance service levels and availability, for example. The reliability overview element 78 shown includes a Combined Issues summary 80, such as a graph that captures a historical trend of the combined reliability related operability issues, a listing of the most current or total number of issues, and a trending number that represents the percentage increase/decrease in the number of issues over the last time period. The reliability overview element 78 also includes an Issue Severity Breakdown panel 82 which shows a breakdown of the current reliability related operability issues among Critical, Warning, and Information. A user may drill down on the panel 82 to obtain detailed information on the specific issues. For example, the system administrator can use a mouse or a touch-enabled interface device such as a tablet, to select one of the Critical, Warning, and Information subpanels to obtain additional information regarding the details of the components of the computer environment resources 12 having the reliability related operability issues. The reliability overview element 78 also includes an Issues in Progress summary 81 that identifies the number of reliability issues associated with the computer infrastructure 11 across the compute, storage, and network attributes.

The capacity overview element 66 is configured to capture the detailed number of capacity related operability issues and to aggregate the operability issues across compute, storage, and network attributes of the computer infrastructure 11 or computer environment resources 12. For example, a capacity overview element 66 includes a Combined Issues summary 68, such as a graph that captures a historical trend of the combined capacity related operability issues, a listing of the total number of issues present, and the trend in the issues, whether increasing or decreasing. The capacity overview element 66 also includes an Issue Severity Breakdown panel 70 which shows a breakdown of the number current capacity related issues among Critical, Warning, and Information. A user may drill down on the panel 70 to obtain detailed information on the specific issues. For example, the system administrator can use a mouse or a touch-enabled interface device such as a tablet, to select one of the Critical, Warning, and Information subpanels to obtain additional information regarding the details of the components of the computer environment resources 12 having the capacity related issues. The capacity overview element 66 also includes an Issues in Progress summary 69 that identifies the number of capacity related operability issues associated with the computer infrastructure 11 across the compute, storage, and network attributes.

FIG. 4, illustrates an arrangement of the compute row 60, as provided by the GUI 50, having a compute performance element 92, a compute efficiency element 96, a performance reliability element 94, and a compute capacity element 90.

The compute performance element 92 summarizes the aggregate compute performance of the computer environment resources 12 within the computer infrastructure 11. The compute performance element 92 includes a compute performance details panel 104 having a Host CPU Utilization graph showing a historical trend of the average CPU utilization rate (%) for the currently filtered level, a summary number or quality number which represents how much variation/swing (%) there is in the CPU utilization rate for the given time period, and a trending number showing the percentage increase/decrease in the variation number over the last time period. The compute performance details panel 104 also includes a CPU Ready Time graph showing a historical trend of the CPU availability for the currently filtered level, a summary number or quality number which represents how much variation/swing (%) there is in the CPU availability for the given time period, and a trending number showing the percentage increase/decrease in the variation number over the last time period. The compute performance details panel 104 also includes a Memory Utilization graph which can show, for example, a historical trend of the average memory utilization rate (%) for the currently filtered level, a summary or quality number which represents how much variation/swing (%) in the memory utilization rate there is for the given time period, and a trending number which shows the percentage increase/decrease in the variation number over the last time period. The compute performance element 92 also includes a Memory Ballooning or Stress graphs which can show, for example, a historical trend of the load on the compute attributes of the computer environment resources 12 over time, as well as a summary number and a trending number relating to the stress. The compute performance element 92 also includes a Memory Swapping graph which can show, for example, a historical trend of the memory swaps of the computer environment resources 12 over time, as well as a summary number and a trending number relating to the memory swaps.

In one arrangement, the compute performance element 92 can include a Virtual Machines by Performance panel (not shown) which ranks the virtual machines of the computer environment resources 12 by performance, either ascending or descending, and an Application Groups by Performance panel (not shown) which ranks the application groups of the computer environment resources 12 by performance.

The compute efficiency element 96 summarizes the aggregate compute efficiency of the computer environment resources 12 for a currently filtered level. The compute efficiency element 96 includes a compute efficiency details panel 116 having a Waste Cost or Utilization graph showing a historical trend of the overall compute environment utilization (i.e., where compute includes CPU and memory) for the currently filtered level. Stress and Utilization should be in balance to make sure that the computer infrastructure 11 is utilized sufficiently and so that there is enough stress on the computer infrastructure 11 to make sure that it delivers established service levels and does not degrade the performance. The Waste Cost or Utilization graph of the compute efficiency element 96 also includes a summary number representing the cost of the waste for the given time period, and a trending number showing the percentage increase/decrease in the waste cost over the last time period. The compute efficiency details panel 116 also includes a Waste—Virtual CPU graph showing a historical trend of the waste associated with the virtual CPUs executed by the computer environment resources 12 as derived from analysis of the idle compute resources, a summary number representing the waste, and a trending number showing the percentage increase/decrease in the waste of the Virtual CPU resources in the environment resources 12 over the last time period. The compute efficiency element 96 can also include a Waste-Virtual Memory and an Average VMs per Host graph, summary number, and trending number.

In one arrangement, the compute efficiency element 96 can also include a graph (not shown) that represents a density of the computer infrastructure 11 over time (e.g., a ratio of number of VMs per host). Such a graph can provide information on how densely populated the computer infrastructure 11 is and whether there is an opportunity to increase the density of the computer infrastructure 11 to provide a substantially efficient utilization of hardware resources.

In one arrangement, the compute efficiency element 96 can also include a Virtual Machines by Efficiency panel (not shown) and an Application Groups by Efficiency panel (not shown) which represents a list of VMs and application groups that are not efficiently being used within a selected environment of the computer infrastructure 11.

The compute reliability element 94 summarizes the aggregate compute reliability of the computer environment resources 12 for a currently filtered level. The compute reliability element 94 includes a compute reliability details panel 110 having a Host Uptime or Availability graph showing a historical trend of all the compute related failures for the currently filtered level, a summary number representing the current number of availability related violations for the given time period, and a trending number showing the percentage increase/decrease in the trend of availability related violations (e.g., failures) of the computer environment resources 12 over the last time period. The compute reliability details panel 110 also includes a Live Migrations graph having a migrations summary number and trending number associated with the computer environment resources 12. Live migrations typically occur due to optimization. However, the rate of live migrations, is conventionally relatively low and steady. In the case of availability related operability issues, such as host failures, an increase in rate of live migrations indicate that the failures in the computer infrastructure 11 are occurring. This result correlates to the Host Uptime or Availability graph provided by the compute reliability details panel 110.

In one arrangement, the compute reliability element 94 can include a Virtual Machines by Reliability panel (not shown) which ranks the virtual machines of the computer environment resources 12 by reliability and an Application Groups by Capacity panel (not shown) which ranks the application groups of the computer environment resources 12 by reliability. In one arrangement, the compute reliability element 94 can include an environmental analysis graph (not shown) that provides an analysis of the computer infrastructure 11 in the form of a graph. The environmental analysis graph can provide information regarding the analysis of the environment availability within the computer infrastructure 11 and the number of host failures that the computer infrastructure 11 can sustain at all times.

The compute capacity element 90 summarizes the aggregate compute capacity of the computer environment resources 12 for a currently filtered level. The compute capacity element 90 includes a compute capacity details panel 98 having a CPU capacity utilization graph which shows a historical trend of the aggregate CPU capacity per computer environment resource for the currently filtered level, a summary number representing the current amount of CPU capacity utilized for a given time period, and a trending number showing the percentage increase/decrease in the amount of CPU capacity utilized over the last time period. The compute capacity element 90 also includes a memory capacity utilization graph showing a historical trend of the usage of the total memory capacity utilization for the currently filtered level, a summary number representing the current aggregate memory capacity utilization (GB) for the given time period, and a trending number showing the percentage increase/decrease in memory capacity usage over the last time period, as well as the top percentage used.

In one arrangement, the compute capacity element 90 can also include a Virtual Machines by Capacity panel (not shown) which ranks the virtual machines of the computer environment resources 12 by capacity usage and an Application Groups by Capacity panel (not shown) which ranks the application groups of the computer environment resources 12 by capacity usage.

FIG. 5 illustrates an arrangement of the storage row 62, as provided by the GUI 50, having a storage performance element 124, a storage efficiency element 128, a storage reliability element 126, and a storage capacity element 122.

The storage performance element 124 summarizes the aggregate storage performance of the computer environment resources 12 for a currently filtered level. The storage performance element 124 includes a storage performance details panel 132 which provides graphs showing historical trends of the average Throughput (e.g., Input/Output Operations per Second (IOPS)) for the currently filtered level, as well as the Deviation associated with the IOPS. The storage performance element 124 also includes summary numbers representing the amount of variation/swing (IOPS) there is in the IOPS the given time period and trending numbers showing the percentage increase/decrease in the variation number over the last time period. The storage performance element 124 also includes graphs, summary numbers and trending numbers associated with the Average Latency (ms) for the currently filtered level, as well as the Deviation of the latency. In one arrangement, the storage performance details panel 132 can also include graphs, summary numbers, and a trending number for a workload IO analysis that identifies base candidate VMs for storage level 18 (e.g., Flash/SSD) caching. Such identification allows a systems administrator to identify and improve the performance of the application, to offload the stress from the storage 18 and network 16 infrastructure (e.g., through host based caching), and to eliminate the storage as a potential bottleneck in delivering the application service levels and performance.

In one arrangement, the storage performance element 124 can also provide graphs showing a ranking of Virtual Machines by storage Performance (not shown) and Application Groups by Performance (not shown).

The storage efficiency element 128 summarizes the aggregate storage efficiency of the computer environment resources 12 for a currently filtered level. The storage efficiency element 128 includes a storage efficiency details panel 136 having a Waste Cost graph showing a historical trend of the overall cost of storage environment waste for the currently filtered level. Such waste can be a representation of a snapshot sprawl, storage used by idle VMs, and other unutilized storage level resources. The Waste Cost or Utilization graph also includes a summary number representing the cost associated with the waste for the given time period and a trending number showing the percentage increase/decrease in the waste cost over the last time period. The compute efficiency details panel 136 also includes a Storage Space Waste graph showing a historical trend of the overall storage environment waste for the currently filtered level. The Storage Space Waste graph also includes a summary number representing the amount of storage space waste for the given time period and a trending number showing the percentage increase/decrease in the waste over the last time period.

In one arrangement, the storage efficiency panel 136 can also provide a ranking of Virtual Machines by efficiency and Application Groups by efficiency (not shown).

The storage reliability element 126 summarizes the aggregate storage reliability of the computer environment resources 12 for a currently filtered level. A storage reliability details panel 134 of the storage reliability element 126 includes an Availability graph showing a historical trend of all the storage availability related service level violations for the currently filtered level, as well as an associated summary number and trending number. The summary number represents the current number of service level violations for the given time period. In one arrangement, the storage reliability element can include a graph showing a historical trend of all the storage related service level violations for the currently filtered level and an uptime state graph associated with the computer environment resources 12 (not shown).

In one arrangement, the storage reliability panel 134 can also provide a ranking of Virtual Machines by storage reliability and Application Groups by storage reliability (not shown).

The storage capacity element 122 summarizes the aggregate storage capacity of the computer environment resources 12 for a currently filtered level. The storage capacity element 122 includes a storage capacity details panel 130 which shows a historical trend of the aggregate storage of the computer environment resources 12 by storage type (Flash, SAS, SATA, etc.), along with associated summary numbers representing the current aggregate storage amount for each type for the given time period, and trending numbers showing the percentage increase/decrease aggregate storage over the last time period for each storage type. In one arrangement, the storage capacity details panel 130 can provide other information as well, such as indications of anomalies in usage as well as forecasting data. The storage capacity element 122 can also include a Virtual Machines by Usage panel and an Application Groups by Usage panel (not shown).

Figure 6:
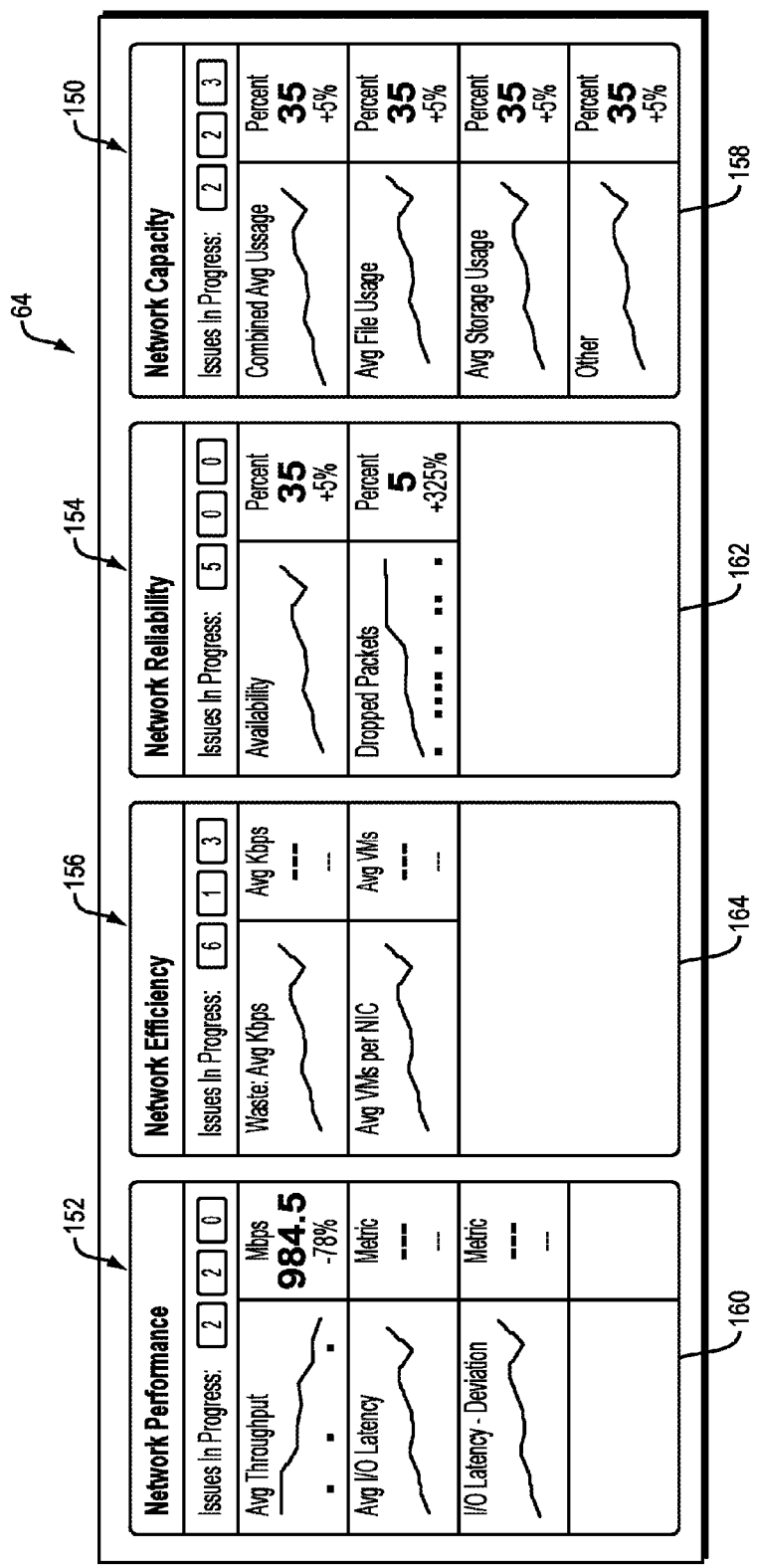
FIG. 6 illustrates a network attribute row of the GUI of FIG. 2, according to one arrangement.

FIG. 6 illustrates an arrangement of the network row 64, as provided by the GUI 50, having a network performance element 152, network efficiency element 156, a network reliability element 154, and a network capacity element 150.

The network performance element 152 summarizes the aggregate network performance of the computer environment resources 12 for a currently filtered level. A network performance details panel 160 includes, for example, an Average Throughput graph showing a historical trend of the average network throughput (KB/s) for the currently filtered level, a summary number that represents how much variation/swing (KB/s) there is in the throughput for a given time period and a trending number showing the percentage increase/decrease in the variation number over the last time period. The network performance details panel 160 also includes graphs, summary numbers, and trending numbers for I/O Latency—Average and I/O Latency—Deviation, associated with the networks 16 of the computer infrastructure.

In one arrangement, the network performance panel 160 can also provide a ranking of Virtual Machines by network performance and Application Groups by network performance (not shown).

The network efficiency element 156 summarizes the aggregate network efficiency of the computer environment resources 12 for a currently filtered level. A network efficiency details panel 164 includes an Average Waste graph, and an Average VMs per network interface card (NIC) graph, showing a historical trends of all of the associated the network related violations for the currently filtered level.

In one arrangement, the network efficiency panel 164 can also provide a ranking of Virtual Machines by network efficiency and Application Groups by network efficiency (not shown).

The network reliability element 154 summarizes the aggregate network reliability of the computer environment resources 12 for a currently filtered level. A network reliability details panel 162 includes an Availability graph showing a historical trend of all the network related failures for the currently filtered level, a summary number representing the current number of failures for the given time period, and a trending number showing the percentage increase/decrease in number of failures over the last time period. The network reliability details panel 162 also includes a Dropped Packets graph and associated summary and trending numbers as well as and an uptime state graph associated with the computer environment resources 12.

In one arrangement, the network reliability panel 162 can also provide a ranking of Virtual Machines by network reliability and Application Groups by network reliability (not shown).

The network capacity element 150 summarizes the aggregate network capacity of the computer environment resources 12 for a currently filtered level. A network capacity usage details panel 158 which provides graphs showing historical trends of the average network capacity usage as broken down by the network protocols for the currently filtered level. Each graph has an associated summary number and trending number.

In one arrangement, the network reliability panel 158 can also provide a ranking of Virtual Machines by network capacity and Application Groups by network capacity (not shown).

Taking FIGS. 3-6 collectively as an arrangement of the GUI 50, the GUI 50 is configured to provide a high level snapshot of capacity, performance, resource utilization (efficiency, over-allocation issues, and waste issues), and availability/service levels (reliability) across application, compute, storage, and network attributes. Further, the GUI 50 is configured as a starting point which allows a system administrator to diagnose a specific problem or anomaly as well as the opportunity for optimization in the computer environment. For example, as indicated above, the GUI 50 provides the system administrator with the ability to drill down on individual components and panels within the GUI 50 in order to obtain a more detailed view of the state of the computer environment resources 12. Additionally, the GUI 50 also provides information on how to improve efficiency of the environment without jeopardizing the established service levels (reliability), as well as actionable insight into how each of the listed issues (including efficiency and performance) can be resolved/improved with ability to also operate in auto-pilot (i.e. solve issues automatically and on scheduled bases). From there the system administrator can diagnose and/or adjust components of the computer environment resources 12 to optimize operation of the computer infrastructure 11. FIGS. 7-9 illustrate examples of such uses of the GUI 50.

Figure 7A:
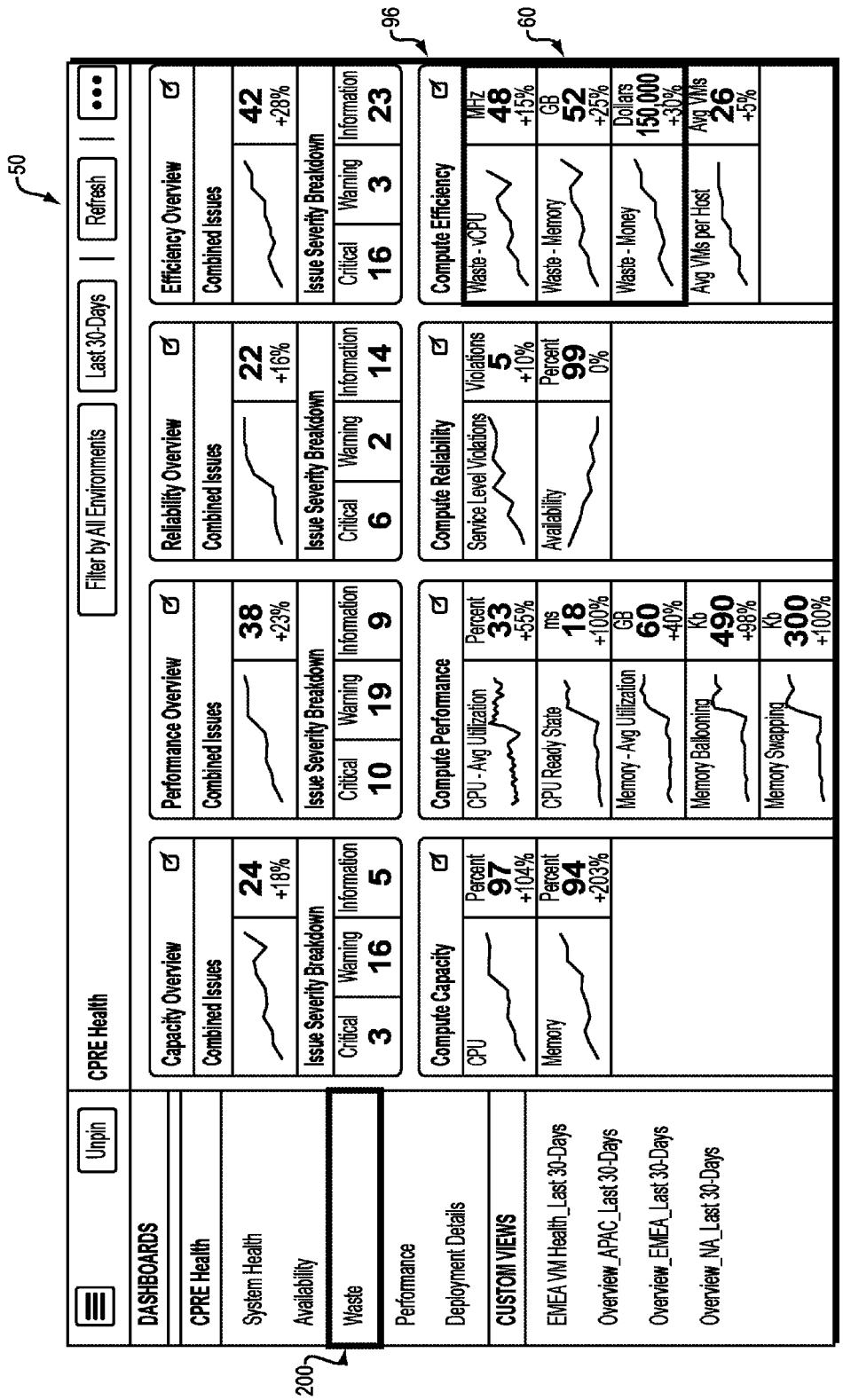
FIG. 7A illustrates a user selection of a Waste dashboard based upon the presentation of the compute attribute and the efficiency metric by the host device.
Figure 8:
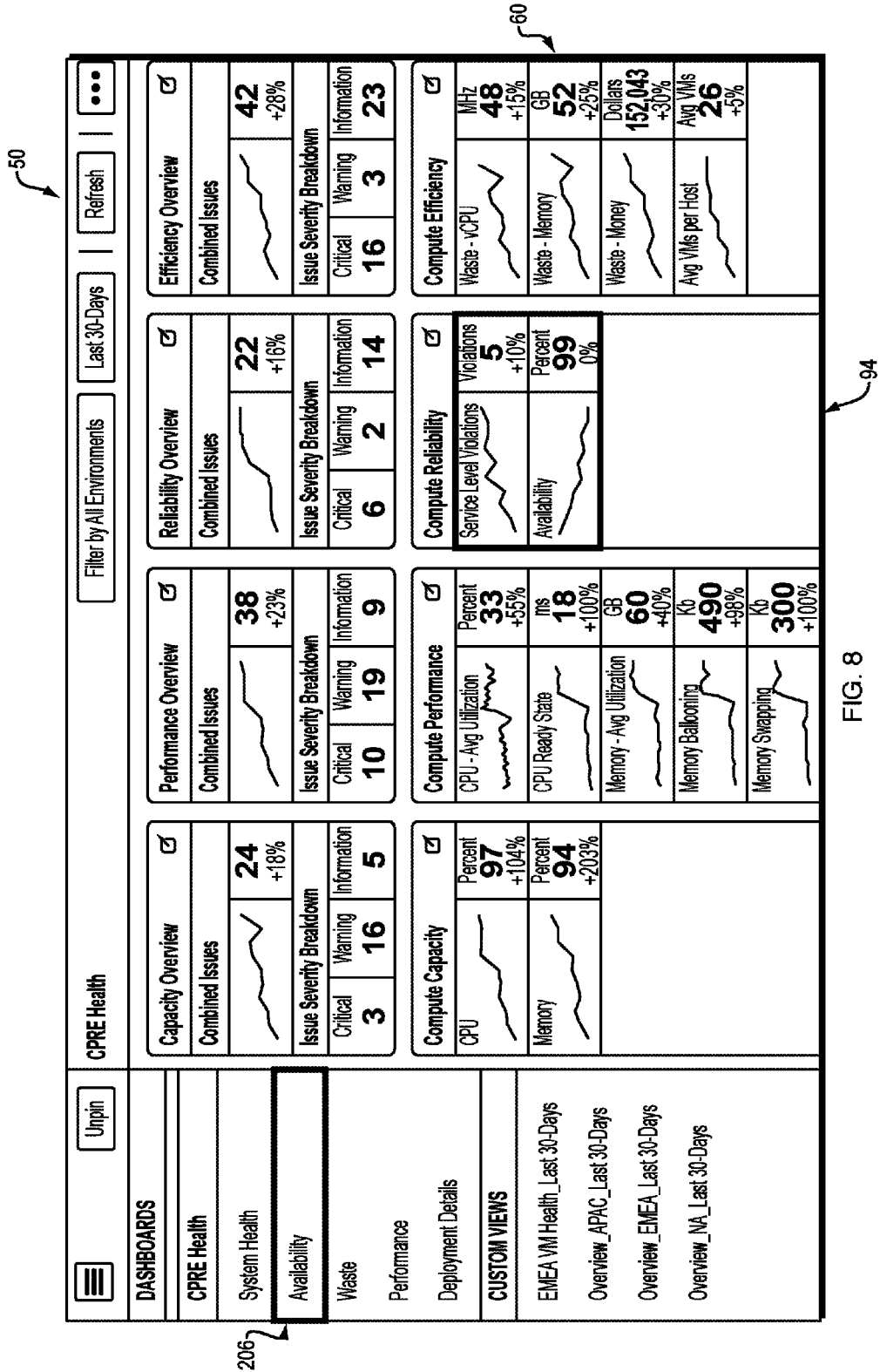
FIG. 8 illustrates a user selection of an Availability dashboard based upon the presentation of the compute attribute and the reliability metric by a host device.

FIG. 7A illustrates an arrangement of the compute row 60 of the GUI 50. Within the compute row 60, a system administrator can view potential money savings and power savings within the computer infrastructure 11 by deleting idle VMs. For example, in use, the system administrator can navigate to the compute efficiency element 96 in the GUI 50 and can identify, via the Waste—vCPU graph and the Waste—Memory graph, that the computer environment resources 12 have experienced an increase in the total waste across vCPU and memory. As indicated by the Waste—Money graph, as well as the associated summary and trending numbers, there is an increase in the amount of money that the enterprise can save by shutting down any unutilized virtual machines that may be taking up CPU or memory resources.

Figure 7B:
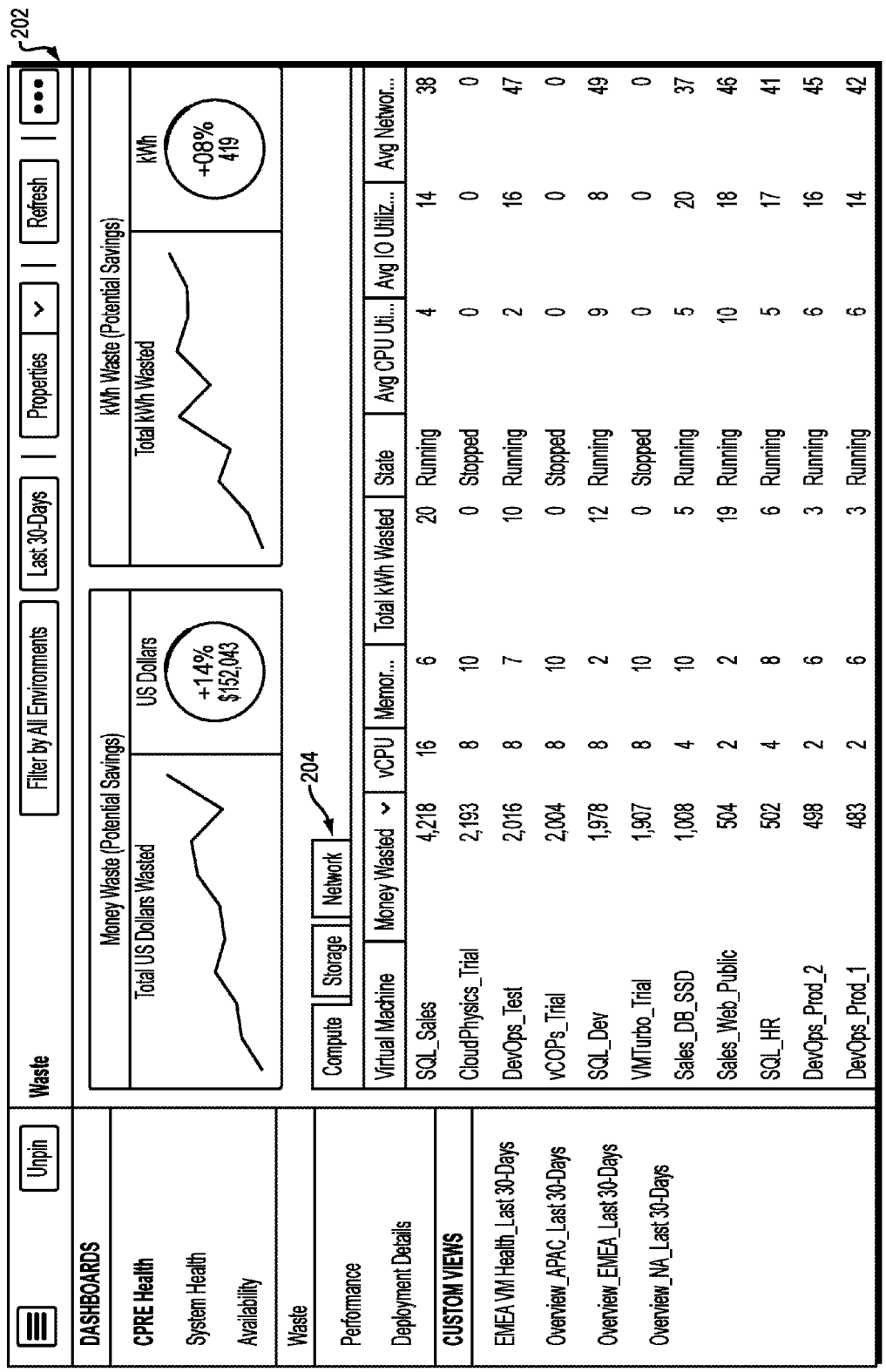
FIG. 7B illustrates the presentation of the Waste dashboard in response to the host device receiving the Waste dashboard selection of FIG. 7A.

Using a mouse, or a touch-enabled interface device such as a tablet, the system administrator can select the compute efficiency element 96 or can select the Waste Dashboard element 200 to provide a dashboard selection to the host device 25. In response to receiving the dashboard selection, as shown in FIG. 7B the host device 25 provides a waste dashboard 202 to the output device 51 which includes a listing 204 of candidate Idle VMs to delete from the computer infrastructure 11. The system administrator can view the listing 204 of VMs and sort based on the number of vCPUs that can be freed, the amount of memory that can be freed, or the amount of money and/or power that the enterprise can save and can take appropriate action.

FIG. 8 illustrates another example arrangement of the compute row 60 of the GUI 50. In use, the system administrator navigates to the compute reliability element 94 in the GUI 50 and can identify five service level violations computer environment resources 12 but that there are no issues with availability. To further investigate, using a mouse, or a touch-enabled interface device such as a tablet, the system administrator can select the compute reliability element 94 or can select the Availability Dashboard element 206 to provide a dashboard selection to the host device 25.

As shown in FIG. 9, in response to receiving the dashboard selection, the host device 25 provides an availability dashboard 208 to the output device 51. The availability dashboard 208 displays a listing of the VMs within the Application Groups inside the computer environment 10. The availability dashboard 208 also displays the health status of the VMs, each VMs host 212, and each VMs associated failover host 214, if assigned. Here, the system administrator can identify that within the SAP Cluster application group 216, all VMs have degraded hosts and failed potential failover hosts. The system administrator can then investigate the issue to determine the root cause of the degraded and failed hosts.

While various embodiments of the innovation have been particularly shown and described, it will be understood by those skilled in the art that various changes in form and details may be made therein without departing from the spirit and scope of the innovation as defined by the appended claims.

For example, as indicated above, the GUI 50 is configured to provide a view of the metrics and attributes associated with the computer environment resources 12. In one arrangement, the GUI 50 is configured with user-selectable filters that filter the view of the GUI 50. For example, the GUI 50 can include an aggregate view filter that allows the display of aggregate information of the entire environment, an environment filter 302, as illustrated in FIG. 3, that allows the view of a specific environment to show aggregate data and analysis, a filter by application group, and a filter by host.

In one arrangement, the system administrator can set the basic unit to use for aggregating the data up to the selected filtered level, such as View by Host (default), View by VM, and View by Application Group.

In one arrangement the system administrator can select a time range for display by the GUI 50. For example, with reference to FIG. 3, the system administrator can activate a time range control element 304 to select from the following time ranges to display: last 24 hours, last 7 days, and last 30 days.

As indicated above, the host device 25 utilizes the data elements 28 to generate a graphical user interface (GUI) 50, relative to the API calls. In one arrangement, with reference to FIG. 1B the host device 25 is configured to receive updated data elements 306 in real time to continuously update the GUI 50. For example, the data provided by the host device 25 to a display 51 can be derived from the real-time stats collected, and then subsampled/averaged out to display the updated GUI 50 as well to as derive any trends and metrics.

What is claimed is:

1. In a host device, a method for analyzing computer environment resources in a computer system, comprising:
    receiving, by the host device, a set of data elements from a computer infrastructure, each data element of the set of data elements relating to at least one of a compute attribute, a storage attribute, and a network attribute of a computer environment resource of the computer infrastructure;
    detecting, by the host device, a performance metric, an efficiency metric, a reliability metric, and a capacity metric for each of the compute attribute, storage attribute, and network attribute associated with the set of data elements; and
    displaying, by the host device, a graphical user interface, the graphical user interface configured to provide the detected performance metric, efficiency metric, reliability metric, and capacity metric and each of the associated compute attribute, storage attribute, and network attribute as a single matrix that provides:
        a compute performance details panel, a compute efficiency details panel, a compute reliability details panel, and a compute capacity details panel;
        a storage performance details panel, a storage efficiency details panel, a storage reliability details panel, and a storage capacity details panel; and
        a network performance details panel, a network efficiency details panel, a network reliability details panel, and a network capacity details panel.

2. The method of claim 1, further comprising providing as part of the graphical user interface, a performance overview element, an efficiency overview element, a reliability overview element, and a capacity overview element,
    the performance overview element providing an aggregate of a compute performance, a storage performance, and a network performance;
    the efficiency overview element providing an aggregate of a compute efficiency, a storage efficiency, and a network efficiency;
    the capacity overview element providing an aggregate of a compute capacity, a storage capacity, and a network capacity; and
    the reliability overview element providing an aggregate of a compute reliability, a storage reliability, and a network reliability.

3. The method of claim 1, comprising:
    receiving, by the host device, at least one updated data element from the computer infrastructure, the updated data element relating to at least one of an updated compute attribute, an updated storage attribute, and an updated network attribute of the computer environment resource of the computer infrastructure;
    detecting, by the host device, at least one of an updated performance metric, an updated efficiency metric, an updated reliability metric, and an updated capacity metric for each of the updated compute attribute, updated storage attribute, and updated network attribute associated with the at least one updated data element; and
    updating, by the host device, the graphical user interface to provide the at least one of the updated performance metric, the updated efficiency metric, the updated reliability metric, and the updated capacity metric.

4. The method of claim 1, further comprising displaying, by the host device, a graphical trend of at least one of the performance metric, efficiency metric, reliability metric, and capacity metric for at least one of the compute attribute, storage attribute, and network attribute.

5. The method of claim 1, further comprising displaying, by the host device, an operability issue associated with at least one of the performance metric, the efficiency metric, the reliability metric, and the capacity metric for at least one of the compute attribute, storage attribute, and network attribute.

6. The method of claim 5, wherein displaying the operability issue comprises displaying, by the host device, at least one of a performance related operability issue, an efficiency related operability issue, a capacity related operability issue, and a reliability related operability issue.

7. The method of claim 1, further comprising:
receiving, by the host device, a dashboard selection via the graphical user interface based upon at least one attribute and the associated metric provided by the graphical user interface; and
displaying, by the host device, a dashboard associated with the selected attribute and associated metric, the dashboard configured to provide at least one of a computer infrastructure attribute performance, computer infrastructure attribute reliability, computer infrastructure attribute efficiency, and computer infrastructure attribute capacity.

8. The method of claim 1, wherein:
the performance metric relates to operability of resources of the computer infrastructure associated with the compute attribute, storage attribute, and network attribute;
the efficiency metric relates to an expenditure of resources of the computer infrastructure associated with the compute attribute, storage attribute, and network attribute;
the reliability metric relates to a service level of resources of the computer infrastructure associated with the compute attribute, storage attribute, and network attribute; and
the capacity metric relates to a utilization capacity of resources of the computer infrastructure associated with the compute attribute, storage attribute, and network attribute.

9. The method of claim 1, further comprising displaying, by the host device, as part of the graphical user interface, an improvement metric, the improvement metric configured to provide insight regarding improvement of the performance metric, efficiency metric, reliability metric, and capacity metric for each of the compute attribute, storage attribute, and network attribute associated with the set of data elements.

10. A host device, comprising:
a controller comprising a memory and a processor, the controller configured to:
receive a set of data elements from a computer infrastructure, each data element of the set of data elements relating to at least one of a compute attribute, a storage attribute, and a network attribute of a computer environment resource of the computer infrastructure;
detect a performance metric, an efficiency metric, a reliability metric, and a capacity metric for each of the compute attribute, storage attribute, and network attribute associated with the set of data elements; and
display a graphical user interface, the graphical user interface configured to provide the detected performance metric, efficiency metric, reliability metric, and capacity metric and each associated compute attribute, storage attribute, and network attribute as a single matrix that provides:

a compute performance details panel, a compute efficiency details panel, a compute reliability details panel, and a compute capacity details panel;
a storage performance details panel, a storage efficiency details panel, a storage reliability details panel, and a storage capacity details panel; and
a network performance details panel, a network efficiency details panel, a network reliability details panel, and a network capacity details panel.

11. The host device of claim 10, wherein the controller is further configured to provide as part of the graphical user interface, a performance overview element, an efficiency overview element, a reliability overview element, and a capacity overview element,
the performance overview element configured to provide an aggregate of a compute performance, a storage performance, and a network performance;
the efficiency overview element configured to provide an aggregate of a compute efficiency, a storage efficiency, and a network efficiency;
the capacity overview element configured to provide an aggregate of a compute capacity, a storage capacity, and a network capacity; and
the reliability overview element configured to provide an aggregate of a compute reliability, a storage reliability, and a network reliability.

12. The host device of claim 10, wherein the controller is configured to:
receive at least one updated data element from the computer infrastructure, the updated data element relating to at least one of an updated compute attribute, an updated storage attribute, and an updated network attribute of the computer environment resource of the computer infrastructure;
detect at least one of an updated performance metric, an updated efficiency metric, an updated reliability metric, and an updated capacity metric for each of the updated compute attribute, updated storage attribute, and updated network attribute associated with the at least one updated data element; and
update the graphical user interface to provide at least one of the updated performance metric, the updated efficiency metric, the updated reliability metric, and the updated capacity metric.

13. The host device of claim 10, the controller further configured to display a graphical trend of at least one of the performance metric, efficiency metric, reliability metric, and capacity metric for at least one of the compute attribute, storage attribute, and network attribute.

14. The host device of claim 10, wherein the controller is further configured to display an operability issue associated with at least one of the performance metric, the efficiency metric, the reliability metric, and the capacity metric for at least one of the compute attribute, storage attribute, and network attribute.

15. The host device of claim 14, wherein, when displaying the operability issue, the controller is configured to display one of an a performance related operability issue, an efficiency related operability issue, a capacity related operability issue, and a reliability related operability issue.

16. The host device of claim 10, wherein the controller is further configured to:
receive a dashboard selection via the graphical user interface based upon at least one attribute and the associated metric provided by the graphical user interface; and display a dashboard associated with the selected attribute and associated metric, the dashboard configured to provide at least one of a computer infrastructure attribute performance, computer infrastructure attribute efficiency, computer infrastructure attribute reliability, and computer infrastructure attribute capacity.

17. The host device of claim 10, wherein:

the performance metric relates to operability of resources of the computer infrastructure associated with the compute attribute, storage attribute, and network attribute;

the efficiency metric relates to an expenditure of resources of the computer infrastructure associated with the compute attribute, storage attribute, and network attribute;

the reliability metric relates to a service level of resources of the computer infrastructure associated with the compute attribute, storage attribute, and network attribute; and the capacity metric relates to a utilization capacity of resources of the computer infrastructure associated with the compute attribute, storage attribute, and network attribute.

18. The host device of claim 10, wherein the controller is configured to display, as part of the graphical user interface, an improvement metric, the improvement metric configured to provide insight regarding improvement of the performance metric, efficiency metric, reliability metric, and capacity metric for each of the compute attribute, storage attribute, and network attribute associated with the set of data elements.

19. A computer program product having a non-transitory computer-readable medium including computer program logic encoded thereon that, when performed on a controller of a host device causes the host device to:

receive a set of data elements from a computer infrastructure, each data element of the set of data elements relating to at least one of a compute attribute, a storage attribute, and a network attribute of a computer environment resource of the computer infrastructure;

detect a performance metric, an efficiency metric, a reliability metric, and a capacity metric for each of the compute attribute, storage attribute, and network attribute associated with the set of data elements; and display a graphical user interface, the graphical user interface configured to provide the detected performance metric, efficiency metric, reliability metric, and capacity metric and each associated compute attribute, storage attribute, and network attribute as a single matrix that provides:

a compute performance details panel, a compute efficiency details panel, a compute reliability details panel, and a compute capacity details panel;

a storage performance details panel, a storage efficiency details panel, a storage reliability details panel, and a storage capacity details panel; and a network performance details panel, a network efficiency details panel, a network reliability details panel, and a network capacity details panel.

20. The computer program product of claim 19 wherein, when performed on the controller of the host device causes the host device to:

display, as part of the graphical user interface, an improvement metric, the improvement metric configured to provide insight regarding improvement of the performance metric, efficiency metric, reliability metric, and capacity metric for each of the compute attribute, storage attribute, and network attribute associated with the set of data elements.

* * * * *